United States Patent [19]

McCulley

[11] Patent Number: 4,458,438

[45] Date of Patent: Jul. 10, 1984

[54] FISH STRIKER INDICATOR

[76] Inventor: Allen R. McCulley, 3207 N. 16 St., Milwaukee, Wis. 53206

[21] Appl. No.: 409,543

[22] Filed: Aug. 19, 1982

[51] Int. Cl.³ .......................................... A01K 97/12
[52] U.S. Cl. ...................................................... 43/17
[58] Field of Search .................... 43/17, 16, 18.5, 17.5

[56] References Cited

U.S. PATENT DOCUMENTS

| | | | |
|---|---|---|---|
| 2,575,049 | 11/1951 | Dean | 43/17 |
| 3,820,268 | 6/1974 | Newton | 43/17 |
| 4,051,616 | 10/1977 | Mathauser | 43/17 |
| 4,235,036 | 11/1980 | Dawson | 43/17 |
| 4,276,711 | 7/1981 | Mathauser | 43/17 |

Primary Examiner—Gene P. Crosby
Attorney, Agent, or Firm—Andrus, Sceales, Starke & Sawall

[57] ABSTRACT

A fish strike indicator for use with a fishing rod to provide a signal when a fish pulls on the fishing line and flexes the tip of the rod. The fish strike indicator includes an electrical control circuit which includes a normally open switch and a sensing wire connected between the switch and the tip of the rod. The sensing wire is operative to maintain the switch in its open position when the tip of the rod is substantially unflexed and to close the switch to actuate a signal light and horn when the tip of the rod flexes beyond a predetermined amount.

7 Claims, 3 Drawing Figures

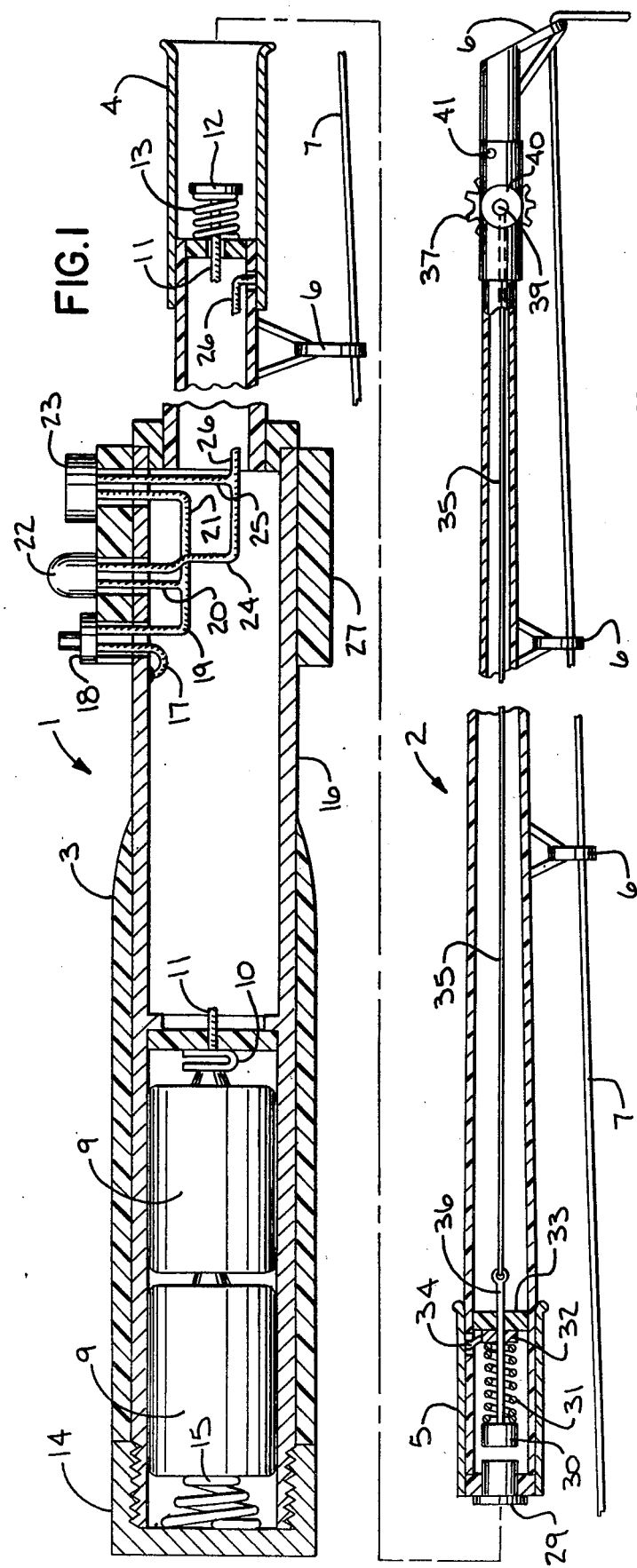
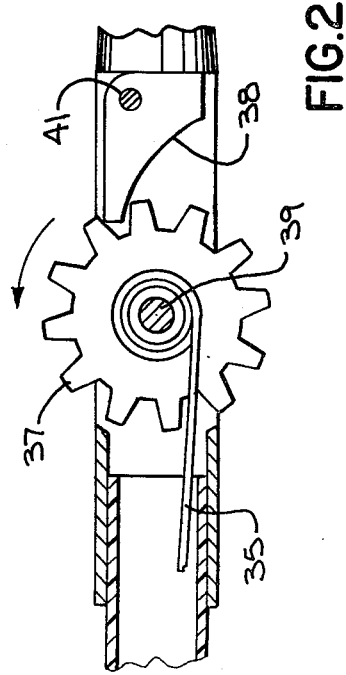
FIG.1
FIG.2
FIG.3

FISH STRIKER INDICATOR

BACKGROUND OF THE INVENTION

The present invention relates to fishing, and more particularly to a signal device for use with fishing rods to indicate a fish strike.

While fishing many fishermen leave their fishing rods in order to partake in various activities such as conversing with other fishermen, eating or other similar activities. In order to accomplish this many fishermen utilize fishing pole "holders" which generally include a tubular member for accommodating the handle end of a fishing pole so that when a fish is caught the rod is not lost. Many other fishermen merely utilize a weight placed on the handle end of the fishing rod to prevent loss of the pole. Irregardless of which method is utilized, a fisherman loses the sense of touch or "feel" of knowing when a fish strikes. Thus, when utilizing a fishing rod holder it is desirable to provide a fish strike indicator which would signal a fisherman when a fish has been caught.

SUMMARY OF THE INVENTION

A fish strike indicator for use with a fishing rod to signal a fisherman when a fish has been caught. The fish strike indicator includes signal means for signaling a fish strike and signal triggering means responsive to the flexing of the tip end of the rod to actuate the signal means.

The signal triggering means includes an electrical control circuit having a source of electric current, a normally open switch means and a sensing means for sensing the position of the tip end of the rod so that when the tip end of the rod flexes beyond a predetermined amount the sensing means causes the switch means to close and actuate the signal means. The switch means includes a first stationary conact member, a second movable contact member and spring means for urging the second contact member into electrical contact with the first contact member. The sensing means includes a tension wire connected between the tip end of the rod and the second contact member. The tension wire is operative to maintain the first and second contact members out of electrical contact when the tip end of the rod is substantially unflexed, and permits the second contact member to move into electrical contact with the first contact member when the tip end of the rod flexes beyond a predetermined amount in response to a fish pulling on the fishing line and flexing the tip end of the rod.

The fish strike indicator includes adjusting means for adjusting the tension of the sensing wire to vary the distance between the first and second contact members so that the signal triggering means may be responsive to different flexed positions of the tip end of the rod. This adjusting means may include a ratchet wheel and pawl mechanism positioned adjacent the tip end of the rod.

In one aspect of the invention the fishing rod is hollow and the source of electric current, switch means and sensing wire are all contained within the rod. In particular, the fishing rod may be of the joined type having a pair of demountable sections, with one section having a female ferrule and the other section having a male ferrule fitting into the female ferrule to join the sections together. Electrical circuit connections connect the movable contact member with one pole of the source of current through the male and female ferrule and the stationary contact member to the other pole of the source of current.

The present invention thus provides an effective fish strike indicator for use with a fishing rod to signal a fisherman when a fish has been caught.

BRIEF DESCRIPTION OF THE DRAWINGS

The drawings illustrate the best mode presently contemplated of carrying out of the invention.

In the drawings

FIG. 1 is a sectional view of a two-piece fishing rod incorporating a fish strike indicator constructed in accordance with the principles of the present invention;

FIG. 2 is a detailed fragmentary view in cross section of the tip end of the fishing rod; and FIG. 3 is a schematic diagram of an electrical control circuit for the fish strike indicator of FIG. 1.

DESCRIPTION OF THE PREFERRED EMBODIMENT

Referring to the drawings, FIG. 1 illustrates a fishing rod having a hollow shaft with a handle end and a tip end. As illustrated, the fishing rod is of a jointed type which includes a pair of demountable sections 1 and 2. Rear section 1 includes a hand grip 3 at one end constructed of insulating materials and a metal sleeve or female ferrule 4 at its other end. A complementary male ferrule 5 is located on the front section 2 of the fishing rod which fits into female ferrule 4 to join sections 1 and 2 together. When assembled, the rod includes a plurality of spaced line guides 6 for use with a fishing line 7 and reel (not shown) for catching fish.

The fishing rod described to this point may be considered conventional and known to those skilled in the art.

As a unique feature, the fishing rod includes a fish strike indicator for signaling a fisherman when a fish has been caught. The fish strike indicator includes a signal means or alerting the fisherman that a fish has been caught, and signal triggering means for actuating the signal means.

The signal triggering means includes an electrical control circuit schematically shown in FIG. 3 having a source of electric current 8 which includes a pair of 1.5 volt batteries 9 disposed one behind the other within the handle end of the fishing rod. The batteries 9 are positioned one behind the other in series connection so that their positive poles engage a U-shaped contact member 10 mounted on an insulating support within the handle portion of the rod. A wire 11 electrically connects the contact member 10 to another contact member 12 which is mounted on the insulated a base of female ferrule 4. Contact 12 is biased to the right as shown in FIG. 1 by a spring 13, the purpose of which hereinafter will be described.

Batteries 9 may be inserted and removed from the handle end of the fishing rod by means of a threaded cap 14. Cap 14 includes a metal spring 15 which engages the negative poles of batteries 9 so that an electrical connection is made with a metal sleeve 16 which forms the handle end of the rod. Sleeve 16 is connected by means of a wire 17 to one side of an on-off switch 18. The other side of the switch 18 is connected via wires 19, 20 and 21 to a light 22 and horn 23 which are in turn connected via wires 24, 25 and 26 the metal female ferrule 4. As shown in FIG. 1, the switch 18, light 22 and horn 23 are mounted on the sleeve 16 of section 1 by means of an annular member 27 which may be secured thereon in any conventional manner. As shown in FIG. 3, the switch 18 is connected in series with the batteries 8 and 9 while the light 22 and horn 23 are connected in parallel to insure that if one of these signal devices is non-operational the other may still be actuated.

A normally open switch 28 is associated with male ferrule 5, as seen best in FIG. 1. The switch 28 includes a stationary carbon contact member 29 mounted on an insulating support of ferrule 5 and a movable carbon contact member 30 which is normally urged into electrical contact with the stationary contact 29 by means of a spring 31. One end of spring 31 bears against the movable contact 30 and the other end bears against another contact 32 which is mounted on an insulating support 33 within section 2. Contact 32 is also electrically connected to male ferrule 5 by means of a wire 34. As a result, when male ferrule 5 is fit into female ferrule 4 to assemble the rod an electrical control circuit for light 22 and horn 23 is provided substantially as shown in FIG. 3. Thus, movable contact member 30 is connected to the negative poles of batteries 9 through ferrules 4 and 5, and stationary contact 29 is connected to the positive poles of batteries 9 through spring loaded contact 12. Spring 13 forces member 12 against member 29 to insure electrical contact therebetween.

As a means for sensing the position of the tip end of the rod so that when the tip end of the rod flexes beyond a predetermined amount, as determined by the spacing or distance between contacts 29 and 30, switch 28 closes and actuates light 22 and horn 23, the fishing rod includes a sensing wire 35 contained within front rod section 2. Sensing wire 35 is connected between the tip end of the rod and movable contact member 30, and is operative to maintain contact members 29 and 30 out of electrical contact when the tip end of the rod is substantially unflexed. However, when the tip end of the rod flexes beyond a predetermined amount, as determined by the distance between contact members 29 and 30, sensing wire 35 permits contact member 30 to move into electrical contact with stationary contact 29 to actuate light 22 and horn 23.

In order to accomplish this, one end of sensing wire 35 is connected to a pin 36 which extends through support 33, contact 32 and spring 31 and is secured to movable contact 30. The other end of sensing wire 35 is connected to an adjustment means for adjusting its tension so that the distance between contact members 29 and 30 may be varied. As shown best in FIG. 2, the adjustment means includes a ratchet means having a ratchet wheel 37 about which the sensing wire 35 is wound and a pawl 38 positioned adjacent the tip end of the rod. Ratchet wheel 37 is mounted for rotation on a shaft 39 and may be manually rotated by a knob 40. Pawl 38 is pivotally attached to the tip end of the rod by means of a pin 41. Ratchet wheel 37 and pawl 38 operated in a conventional manner so that the tip of the tongue or pawl 38 engages the notches in wheel 37 to permit counterclockwise movement for wheel 37, as shown in FIG. 2, but prevent clockwise movement thereof. Thus, the tension on wire 35 and thus the distance between contacts 29 and 30 may be varied by turning wheel 37 by means of knob 40.

In operation, the two sections 1 and 2 of fishing rod are joined together by inserting male ferrule 5 into female ferrule 4 and the batteries 9 are inserted within the handle portion of the rod so that the control circuit schematically illustrated in FIG. 3 is provided. After casting, switch 18 is moved to its closed position connecting the batteries 9 with light 22 and horn 23. The handle end of the rod may then be placed within a fishing rod holder, and the knob 40 rotated in a counterclockwise direction so that contact 30 is spaced in relation to contact 29 in switch 28. Thus, when a fish is caught and pulls on fishing line 7, the tip end of the rod will flex downwardly as shown in FIG. 1 and contact 30 will be moved to the left as shown in FIG. 1 by spring 31 until it engages contact 29 and closes the control circuit to actuate light 22 and horn 23. It is readily obvious to those skilled in the art that the tension of sensing wire 35 may be adjusted to avoid actuating light 22 and horn 23 due to the normal flexing of the tip end of the rod resulting from wave action. Thus, if it is found that the light 22 and horn 23 are continuously becoming actuated due to wave action, ratchet wheel 37 should be rotated counterclockwise to increase the distance between contacts 29 and 30 so that only an actual fish strike will actuate light 22 and horn 23.

A fish strike indicator for use on a fishing rod has been shown and described. It is readily obvious to those skilled in the art that various modifications may be made to the structure specifically shown and described herein. For example, a tensioning screw may be utilized instead of the ratchet wheel 37 and pawl 38. In addition, various types of switches, signaling devices and electrical connections may be substituted for the components specifically described herein.

Various modes of carrying out the invention are contemplated as being within the scope of the following claims particularly pointing out and distinctly claiming the subject matter which is regarded as the invention.

I claim:

1. A fish strike indicator for use with a fishing rod having a shaft with a handle end and a tip end, comprising:

signal means for signaling a fish strike; and
signal triggering means responsive to the flexing of the tip end of the rod, said signal triggering means includes an electrical control circuit having a source of electric current, a normally open switch means connected in series with said source of current, said switch means includes a first stationary contact member, a second movable contact member and spring means for urging said second contact member into electrical contact with said first contact member, and sensing means for sensing the position of the tip end of said rod so that when the tip end of the rod flexes beyond a predetermined amount said sensing means causes said switch means to close and actuate said signal means, said sensing means includes a sensing wire connected between the tip end of said rod and said second contact member, said wire being operative to maintain said first and second contact members out of electrical contact when said rod tip end is substantially unflexed and to permit said second contact member to move into electrical contact with said first contact member when said rod tip end flexes beyond a predetermined amount.

2. The fish strike indicator of claim 1, wherein said circuit further includes an on-off switch connected in series with said source of current and switch means.

3. The fish strike indicator of claim 1, wherein said signal means is connected in parallel in said control circuit.

4. The fish strike indicator of claim 1, wherein said fishing rod is hollow of said source of electric current, contact members and sensing wire are contained within said rod.

5. The fish strike indicator of claim 4, wherein said fishing rod is jointed and includes a pair of demountable sections, one of said sections having a female ferrule and the other of said sections having a male ferrule fitting into said female ferrule to join said sections, and further including electrical connections connecting said movable contact member with one pole of said source of current through said male and female ferrules and said stationary contact member to the other pole of said source of current.

6. The fish strike indicator of claim 1, further including adjusting means for adjusting the tension of said wire to vary the distance between said first and second contact members so that said signal triggering means may be responsive to different flexed positions of the tip end of said rod.

7. The fish strike indicator of claim 6, wherein said adjusting means includes a ratchet means positioned adjacent the tip end of said rod, said ratchet means including a ratchet wheel about which one end of the sensing wire is wound so that when said wheel is rotated the tension on said wire is varied.

* * * * *